US008583472B2

(12) United States Patent
Iannucci et al.

(10) Patent No.: US 8,583,472 B2
(45) Date of Patent: Nov. 12, 2013

(54) MEASURING CUSTOMER SERVICE LEVELS (75) Inventors: Louis A. Iannucci, Hudson, MA (US);
Robert J. Ronan, Hopkinton, MA (US);
Peter E. Kulis, Westford, MA (US)

(73) Assignee: FMR LLC, Boston, MA (US)

( * ) Notice: Subject to any disclaimer, the term of this patent is extended or adjusted under 35 U.S.C. 154(b) by 1686 days.

(21) Appl. No.: 10/938,412

(22) Filed: Sep. 10, 2004

(65) Prior Publication Data

US 2006/0059034 A1 Mar. 16, 2006

(51) Int. Cl.
*G06Q 10/00* (2012.01)
(52) U.S. Cl.
USPC .......................................... 705/7.39; 709/224
(58) Field of Classification Search
USPC .......................................... 705/7.39; 709/224
See application file for complete search history.

(56) References Cited

U.S. PATENT DOCUMENTS

| | | | |
|---|---|---|---|
| 5,958,009 A | 9/1999 | Friedrich et al. | |
| 6,003,079 A | 12/1999 | Friedrich et al. | |
| 6,006,260 A * | 12/1999 | Barrick et al. | 709/224 |
| 6,067,565 A * | 5/2000 | Horvitz | 709/218 |
| 6,263,361 B1 * | 7/2001 | Hoyer et al. | 709/203 |
| 6,317,787 B1 * | 11/2001 | Boyd et al. | 709/224 |
| 6,434,513 B1 * | 8/2002 | Sherman et al. | 702/186 |
| 6,438,592 B1 * | 8/2002 | Killian | 709/224 |
| 6,446,123 B1 * | 9/2002 | Ballantine et al. | 709/224 |
| 6,466,918 B1 * | 10/2002 | Spiegel et al. | 705/27 |
| 6,591,298 B1 * | 7/2003 | Spicer et al. | 709/224 |
| 6,701,363 B1 * | 3/2004 | Chiu et al. | 709/224 |
| 6,823,382 B2 * | 11/2004 | Stone | 709/224 |
| 6,928,471 B2 * | 8/2005 | Pabari et al. | 709/223 |
| 6,934,735 B1 * | 8/2005 | Emens et al. | 709/203 |
| 6,963,874 B2 * | 11/2005 | Kasriel et al. | 702/180 |
| 6,973,490 B1 * | 12/2005 | Robertson et al. | 709/224 |
| 7,058,704 B1 * | 6/2006 | Mangipudi et al. | 709/223 |
| 7,124,188 B2 * | 10/2006 | Mangipudi et al. | 709/226 |
| 7,197,557 B1 * | 3/2007 | Asar et al. | 709/224 |
| 7,231,442 B2 * | 6/2007 | Chen | 709/224 |
| 7,246,041 B2 * | 7/2007 | Fukuda et al. | 702/189 |
| 7,269,651 B2 * | 9/2007 | Olsson et al. | 709/224 |
| 7,328,265 B2 * | 2/2008 | Anstey et al. | 709/226 |
| 7,353,272 B2 * | 4/2008 | Robertson et al. | 709/224 |
| 7,373,376 B1 * | 5/2008 | Hamer et al. | 709/203 |
| 7,475,067 B2 * | 1/2009 | Clary et al. | 1/1 |

(Continued)

FOREIGN PATENT DOCUMENTS

WO       WO 02/37229       5/2002

OTHER PUBLICATIONS

Amerson, M. et al, "Design for Performance: Analysis of Download Times for Page Elements Suggests Ways to Optimize", (Apr. 18, 2001), IBM Web Site Team, AIM Division, accessed from: http://www.ibm.com/developerworks/websphere/library/techarticles/hipods/perform.html.*

(Continued)

*Primary Examiner* — David Rines
*Assistant Examiner* — Tiphany Dickerson
(74) *Attorney, Agent, or Firm* — Fish & Richardson P.C.

(57) ABSTRACT

Methods and apparatus, including computer program products, for measuring how well interactive components of a service facility that are accessible to users through a communication network perform in serving users, the interactive components being a proper subset of all of the interactive components of the service facility, and using the results of the measuring to evaluate the performance of the service facility with respect to a target performance.

21 Claims, 6 Drawing Sheets

(56) References Cited

U.S. PATENT DOCUMENTS

| | | | |
|---|---|---|---|
| 7,773,536 B2* | 8/2010 | Lloyd et al. | 370/252 |
| 2002/0065864 A1* | 5/2002 | Hartsell et al. | 709/100 |
| 2002/0178169 A1* | 11/2002 | Nair et al. | 707/100 |
| 2003/0130982 A1* | 7/2003 | Kasriel et al. | 707/1 |
| 2003/0131106 A1* | 7/2003 | Kasriel | 709/225 |
| 2003/0145080 A1* | 7/2003 | Breese et al. | 709/224 |
| 2003/0191837 A1* | 10/2003 | Chen | 709/224 |
| 2003/0208523 A1* | 11/2003 | Gopalan et al. | 709/201 |
| 2004/0088406 A1* | 5/2004 | Corley et al. | 709/224 |
| 2004/0205184 A1* | 10/2004 | Olsson et al. | 709/224 |
| 2005/0080661 A1* | 4/2005 | Casati et al. | 705/10 |
| 2005/0107985 A1* | 5/2005 | Agrawal et al. | 702/186 |
| 2005/0166138 A1* | 7/2005 | Kundu | 715/501.1 |
| 2005/0256954 A1* | 11/2005 | Shapira et al. | 709/224 |
| 2006/0036400 A1* | 2/2006 | Kasriel et al. | 702/182 |

OTHER PUBLICATIONS

Jin, L. et al., "Analysis on Service Level Agreements of Web Services," (Jun. 21, 2002), HP Laboratories Palo Alto HPL-2002-180, Accessed from: www.hpl.hp.com/techreports/2002/HPL-2002-180.pdf.*

Broadwell, P., "Response Time as a Performability Metric for Online Services", (May 2004), accessed from: http://web.archive.org/web/20040612171828/http://roc.cs.berkeley.edu/papers/csd-04-1324.pdf.*

Matthew D Sarrel & Sahil Gambhir, "Early Warning". PC Magazine. New York: Dec. 11, 2001. vol. 20, Iss. 21; p. 159 (text).*

Matthew D Sarrel & Sahil Gambhir, "Early Warning". PC Magazine. New York: Dec. 11, 2001. vol. 20, Iss. 21; p. 159 (graphic).*

MacVittie, L., "Web Site Perspective Holds the Key to Performance Monitoring," Network Computing. Manhasset: Mar. 18, 2002. vol. 13, Iss. 6; p. 20 (2 pages).*

Alsharif, S. A. (2002). Improving QoS for real-time interactive multimedia over the internet using differentiated services. (Order No. 3067502, Florida Institute of Technology). ProQuest Dissertations and Theses, , 136-136 p. Retrieved from http://search.proquest.com/docview/305449195?accountid=14753. (305449195).*

Dan, A. et al., "Web Service Differentiation with Service Level Agreements" (May 1, 2003), 13 pages, accessed from: http://www.ibm.com/developerworks/webservices/library/ws-slafram/.*

Communication from a foreign patent office in a counterpart application (International Search Report and Written Opinion from PCT/US05/31646 dated Jan. 19, 2007).

Moskovitz, D., "Measuring web performance—an overview," *NetForum 2000* presentation (Oct. 7, 2000).

Extended European Search Report for related European application No. 05794839.0 (Oct. 23, 2007).

McGraw-Hill Dictionary of Scientific and Technical Terms, Sixth Edition, p. 1686 (2003).

\* cited by examiner

MEASURING CUSTOMER SERVICE LEVELS

BACKGROUND

This description relates to measuring customer service levels.

Investment firms provide their customers (including managers, plan sponsors and participants) with on-line access to accounts, such as retirement accounts and investment accounts. To access an account via the Internet, for example, an owner of the account enters a user identifier ("ID") and a password on a Web page provided by the investment firm. Once inside the account, the owner can view account information, such as balances, or change account parameters, such as fund allocations, by navigating from one Web page to another within the investment firm's Web site.

Currently, the investment firm may measure the performance of individual Web pages by setting a quality of service performance requirement (e.g., service shall be available at least 99% of each week, download time for a Web page of the Web site shall be less than or equal to 8 seconds) and measuring the quality of service using one or more performance metrics (e.g., availability shall be measured as the number of minutes per day that the service is capable of receiving and responding to messages from the Internet divided by the total number of minutes in a day).

SUMMARY

In general, in one aspect, the invention provides methods and apparatus, including computer program products, for measuring how well interactive components of a service facility that are accessible to users through a communication network perform in serving users, the interactive components being a proper subset of all of the interactive components of the service facility. The results of the measuring are used to evaluate the performance of the service facility with respect to a target performance.

The interactive components of the selected proper subset are key components. The interactive components of the selected proper subset may be assigned weights. The service facility can be a Web-based service. The performance value can be measured using a time-based metric. A user can provide the target performance value for each interactive component of the selected proper subset.

The invention provides methods and apparatus, including computer program products, enabling a user to select interactive components of one or more Web pages associated with the service facility to be included in the proper subset of components. The user can group interactive components of the selected proper subset into one or more groups of interactive components, for example, on a page-basis. A user can provide the target performance value for each group of interactive components.

Advantages of particular implementations of the invention may include one or more of the following. The monitoring application provides a customer service level measurement for a Web-based service that is based on the performance of key components of Web pages associated with the Web-based service rather than the performance of all of the Web pages associated with the Web-based service. In so doing, the monitoring application approximates a customer experience when utilizing the Web-based service.

By measuring the performance of key components rather than all of the pages associated with the Web-based service, the monitoring application filters out performance outliers, thus reducing false positive or false negative results. By monitoring and analyzing the customer service level measurements provided by the monitoring application, a Web-based service provider can determine which of the key components are causing the Web-based service users to have a negative or less than desirable experience, and troubleshoot the problem areas directly. This will enable the Web-based service provider to provide the users of its Web-based service with a consistent and reliable user experience.

The details of one or more examples are set forth in the accompanying drawings and the description below. Further features, aspects, and advantages of the invention will become apparent from the description, the drawings, and the claims.

DETAILED DESCRIPTION

An organization can deploy a Web site to provide its clients with online access to one or more Web-based services. For example, an investment firm can deploy a Web site to provide customers having accounts with the investment firm with online access to a Web-based service that enables customers to manage their accounts. Each Web-based service is associated with a collection of Web pages accessible through the Web site. The Web pages can be static pages stored on and delivered by a Web server, dynamic pages that are generated on-the-fly by programs residing at the Web server, or some combination of static and dynamic pages.

One way in which an organization can measure the success of a Web-based service is by devising a measure that is a good approximation for the customer satisfaction with the customer's experience in interacting with the Web-based service. By deploying a monitoring application on a Web server, a quantifiable approximation of a customer service level may be provided by monitoring the amount by which components of a Web-based service degrade under production conditions.

When displayed on a user interface of a client computer, each Web page includes a set of interactive components that collectively form the Web page. Each "component" includes one or more displayed objects (e.g., a word, a line of text, a paragraph of text, an image, a hyperlink, a button, a counter, etc.) that is perceptible as a unit. Examples of components include a navigation bar, a menu, a footer, a logo, a banner, and a tool bar. Other examples of components are described below with reference to the Web pages of FIGS. 2a, 2b and 2c.

The term "key components" refers to components of Web pages associated with a Web-based service that have been identified (e.g., by the Web-based service provider or the organization) as components representative of a customer's interaction with the Web-based service. A key component is typically associated with a Web page that has a high hit rate (indicating that the component is frequently used or visible, and therefore important to the customer in his interaction with the website). A customer is likely to perceive his interaction with the Web-based service more negatively when a key component experiences performance degradation. Accordingly, by measuring the performance degradation of key components (rather than all of the components) of Web pages associated with a Web-based service, the monitoring application can provide a customer service level measurement that approximates a customer's perception of his experience while using the Web-based service.

Figure 1:
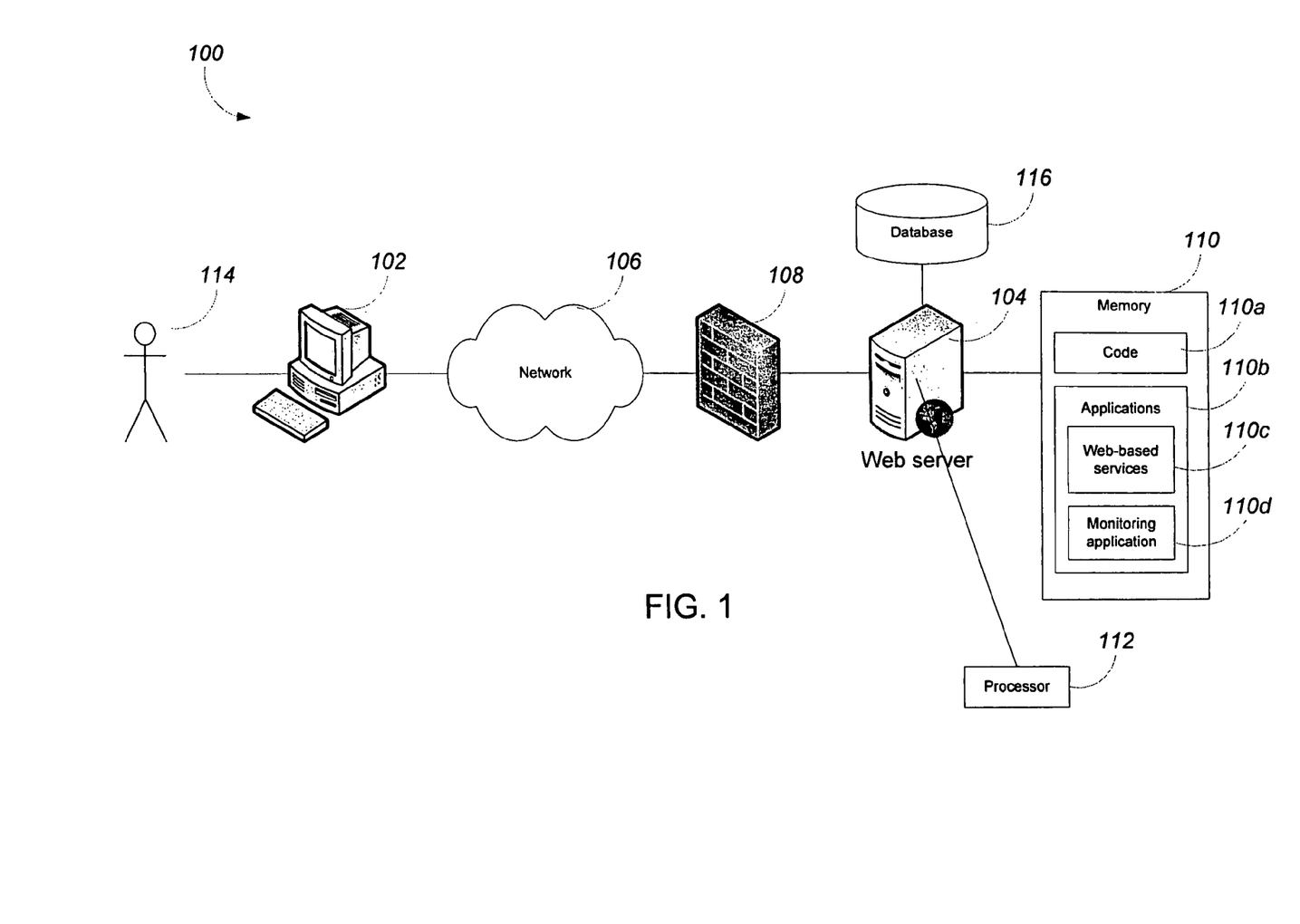
FIG. 1. shows a network system for monitoring customer service levels.

Referring to FIG. 1, a network system 100 for monitoring customer service levels of a Web-based service includes a client computer 102, a server computer 104, a network 106, and a firewall 108. Additional or alternative network devices and computing devices that are not shown may also be included in the system 100.

The network 106 may be the Internet, a wide area network ("WAN"), or any other Internet Protocol (IP) or non-IP network capable of communicating Web pages. Connected to the network 106 is the client computer 102. The client computer 102 is a personal computer ("PC"), or other processing device, which includes a memory for storing computer programs and a processor for executing those programs to perform various functions. Among the programs stored in memory are an operating system, such as Microsoft® Windows® XP, and a Web browser, such as Microsoft® Internet Explorer®, for accessing Web pages from the server computer 104.

The server computer 104 is connected to the network 106 through a firewall 108. In one example, the server computer 104 is a Web server. The Web server 104 includes a memory 110 which stores computer programs and a processor 112 which executes instructions in those computer programs to perform various functions.

The computer programs stored in the memory 110 of the Web server 104 include code 110a and applications 110b. The applications 110b in the Web server 104 include Web-based services 110c that enable a remote user 114 at the client computer 102 to access information on accounts that are accessible to the Web server 104. Examples of commercial embodiments of these Web-based services 110c include Plan Sponsor Webstation® ("PSW"), eWorkplace ("eWP") and NetBenefits$^{SM}$, from Fidelity Investments®. PSW provides a plan sponsor, such as an employer, with information about an investment plan. For example, using PSW, an employer can obtain information about its employees' retirement plan. eWP provides human resource representatives and managers the ability to perform human resource transactions (i.e. hiring, employee reviews, etc.). NetBenefits provides an individual, such as an employee, with information about investment accounts and other financial services available to the individual.

The code 110a in the Web server 104 receives identification information from a customer, and authenticates the customer based on information in a database 116. The database 116 includes user identifiers, passwords, and other information for permitting a customer to access an account. Once the customer is authenticated, the code 110a retrieves information from the database 116 and provides that information to the customer. This information identifies which of the applications 110b are accessible to the customer.

Figure 2A:
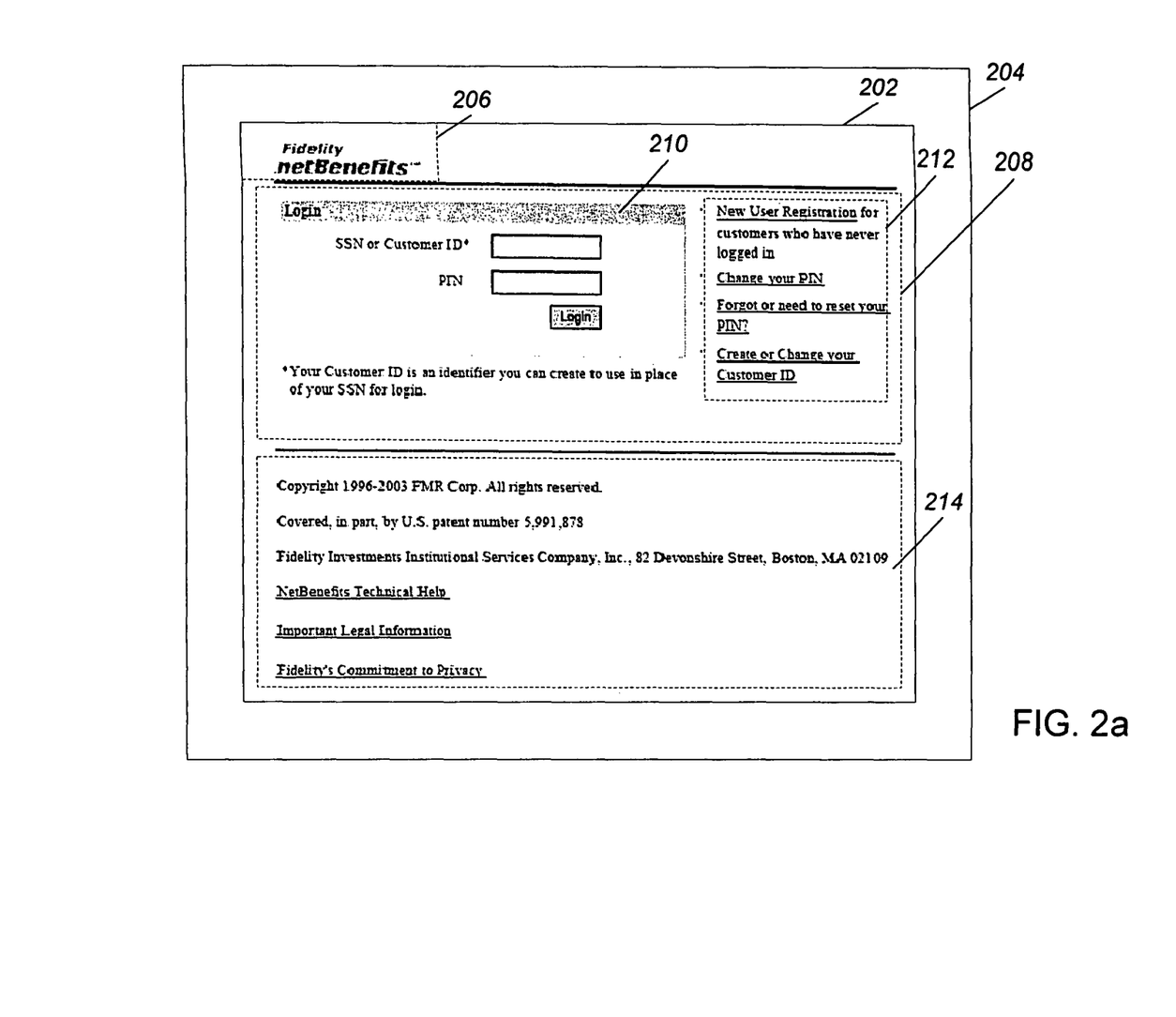
FIGS. 2a-2c are screenshots of a Web-based service.

FIG. 2a shows an example screenshot of a Fidelity NetBenefits home page 202 on a display 204. The Web page 202 includes a corner component 206, and a body component 208. In other examples, additional or different components, for example, a navigation bar component may be included in a Web page. In the example shown in FIG. 2a, the corner component 206 contains a logo for the NetBenefits Web site, and the body component 208 includes a user input section 210 in which a customer may enter identification information in the form of a user ID and password. The body component 208 also includes hyperlinks 212 to other Web pages of the Web-based service. The Web page 202 also includes a footer component 214 that includes lines of text and additional hyperlinks.

Figure 2B:
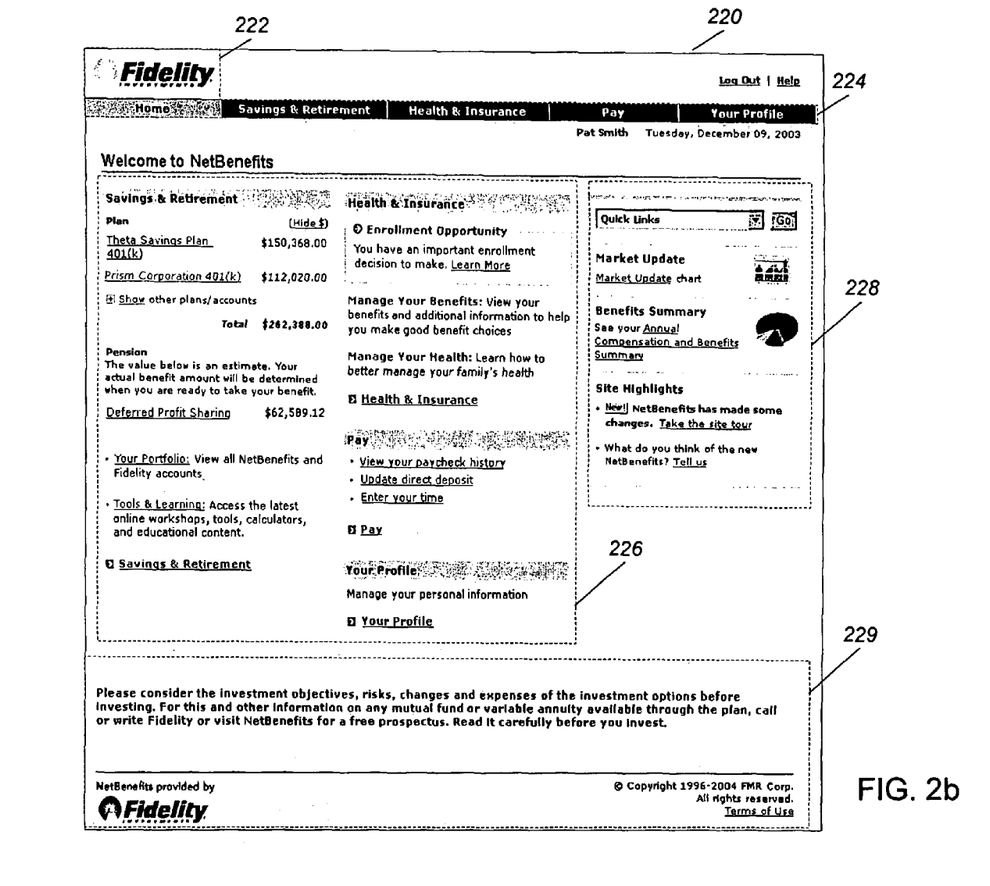

FIG. 2b shows an example screenshot of a NetBenefits user home page 220 associated with a particular customer, which, in this illustrated example, is Pat Smith. The Web page 220 has a corner component 222 that includes the "Fidelity Investments" logo, and a navigation bar component 224 that provides links for top-level topic areas that are accessible from any Web page associated with the NetBenefits Web site. In a body component 226 of Pat Smith's user home page 220, links (shown as underlined text) for service features that are available to Pat Smith's account are displayed. These links include links for viewing and modifying "Savings and Retirement" information, links to view "Pay" information, and links to manage personal information ("Profile"). The Web page 220 also includes a second navigation bar component 228 that provides links to topics that may be of interest to the customer "Pat Smith", and a footer component 229 that includes lines of text and a "NetBenefits provided by Fidelity Investments" logo.

Figure 2C:
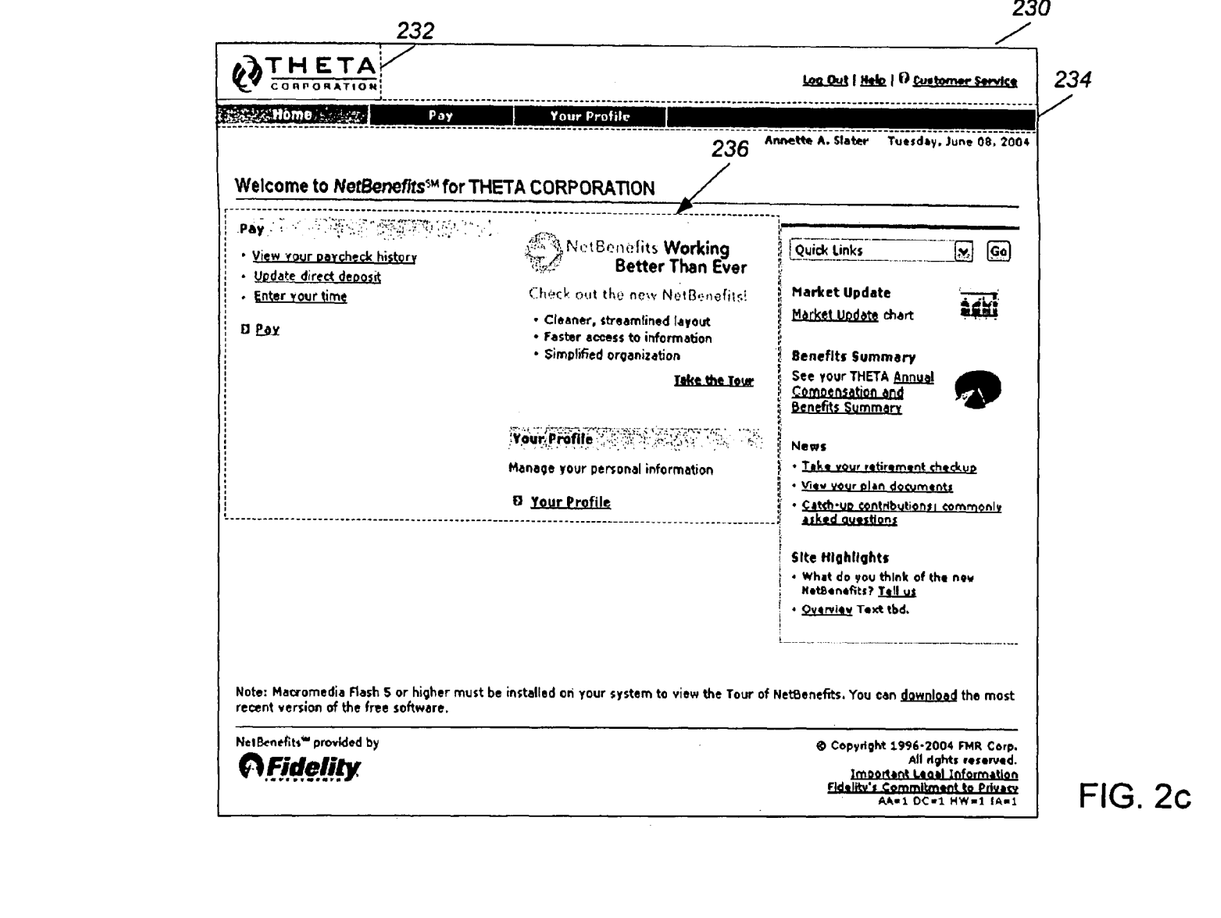

FIG. 2c shows an example screenshot of a NetBenefits user home page 230 associated with a customer, which, in this illustrated example, is Annette A. Slater. The Web page 230 has a corner component 232 that includes the "Theta Corporation" logo, and a navigation bar component 234 that provides links for top-level topic areas that are accessible from any Web page associated with the "NetBenefits for Theta Corporation" Web site. In the body component 236 of Annette A. Slater's user home page 230, links (shown as underlined text) for service features that are available to Annette A. Slater's account are displayed.

As can be seen from the screenshots, there are fewer service features available to Annette A. Slater's account as compared to that of Pat Smith's account.

In some instances, the download time for the Web pages shown in FIGS. 2b and 2c is the same due to network conditions. In other instances, the download time is proportional to the number of objects to be displayed in the body component of the Web page, as the other components, e.g., the corner component and the navigation bar component, are the same on both Web pages.

Figure 3:
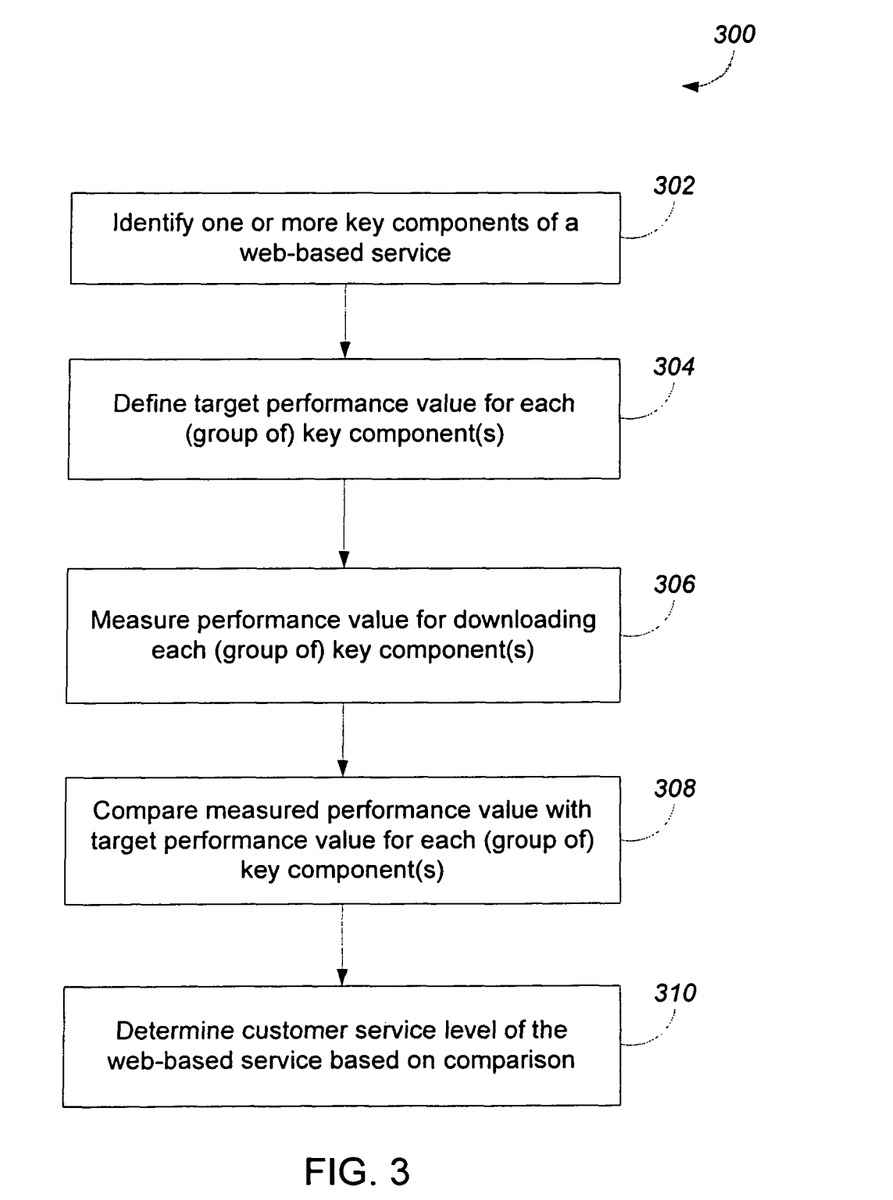
FIG. 3 shows a customer service level monitoring process.

FIG. 3 shows a customer service level ("CSL") monitoring process 300 that allows a Web-based service provider to obtain a reasonable approximation of a customer's satisfaction with the customer's experience in interacting with a Web-based service. One or more components of Web pages associated with a Web-based service are identified (302) to a monitoring application 110d as key components.

Generally, the Web-based service provider identifies a proper subset (i.e., a subset which is not the entire set) of the components of the Web pages associated with the Web-based service as key components. In most instances, a proper subset of the components of one or more Web pages is identified as key components. However, there may be instances in which the set of all of the components that collectively form a particular Web page are identified as key components. The components that are identified as key components typically have a close clustering of performance value measurements regardless of customer or customer input. In other words, the amount of time it takes to download a particular key component from the Web server to a client computer is relatively consistent regardless of who the customer is, and which selections are made by the customer within the Web-based service.

Referring to the examples shown in FIGS. 2a, 2b and 2c, a service provider is likely to identify the corner component 222, 232 and the navigation bar component 224, 234 as key components of the NetBenefits Web site because these components are the same regardless of user. The service provider may also include the body component 208 of the NetBenefits home page 202 shown in FIG. 2a as a key component (thus identifying all components of the NetBenefits home page as key) because the NetBenefits home page is a high hit page that is frequented by many (if not all) NetBenefits customers, and is therefore representative of a customer's interaction with the NetBenefits Web site.

The service provider is unlikely to identify the body component 226, 236 of the NetBenefits user home pages shown in FIGS. 2b and 2c as a key component because the number of links (or objects) displayed in the body component 226, 236 differ based on the number of service features that are available to a particular user's account. Other components on other pages associated with the NetBenefits Web site may also be identified as key components.

Selection of key components is preferably done by the service provider prior to deployment of the NetBenefits application. However, the service provider may select key components on an on-going basis as new features and Web pages are added to the NetBenefits application.

After identifying the key components, the service provider defines (304) a target performance value for each key component using a suitable performance metric. A performance value is a value indicating how quickly a component is downloaded from the Web server to a client computer. A performance value may be expressed in terms of time (e.g., it took 1 second to download component X from a Web server to a client computer) or data rate (e.g., data for component X was transmitted at an average rate of 5 megabytes per second).

In one example, the service provider operator defines a target performance value (e.g., through a graphical user interface of the monitoring application 110d) for each key component using a time-based metric. In another example, the service provider operator groups the key components on a page-basis and defines a target performance value for each page of key components using a time-based metric, such as "1 second to create, download and display key components of a Web page with a T1 connection" and "5 seconds to create, download and display key components of a Web page with a 56 k connection". In this example, the service provider operator defines a target performance value based on an aggregate download time for all of the key components associated with a particular Web page. As long as all of the key components of the Web page are created, downloaded and displayed in 1 second or less with a T1 connection, for example, the target performance value is met regardless of how long it takes for the remaining components of that Web page to be created, downloaded and displayed.

After defining the target performance values, the monitoring application 110d measures a performance value of each user request of a key component. For example, the monitoring application 110d measures (306) the download time for each key component of a Web site and compares (308) the measured performance value with the respective target performance value. A measured performance value that is less than or equal to a respective target performance value signifies an acceptable download time for the key component. The monitoring application 110d then determines (310) a CSL associated with the Web-based service based upon the comparisons of the measured performance values with the target performance values of all of the key components of the Web site. In one implementation, the monitoring application 110d calculates the CSL for the Web site using the following formula:

$$CSL(T) = \frac{\text{Number of key components of the web site with acceptable download time}(T)}{\text{Total number of downloaded key components of the web site }(T)} \times 100$$

where T represents a sample. For example, if in a given hour, 45,978 key components out of a total of 48,457 components satisfied the previously-set benchmark criteria, the monitoring application 110d calculates the CSL for the Web site to be approximately 95%.

$$CSL(T) = \frac{45978}{48457} \times 100 \approx 94.8$$

In another example, the monitoring application 110d measures the aggregate download time for the key components of each Web page and compares the measured performance value with the target performance value for the key components of the respective Web page. A measured performance value that is less than or equal to a respective target performance value signifies an acceptable download time for the key components of a particular Web page. The monitoring application 110d then calculates the CSL using the following formula:

$$CSL(T) = \frac{\text{Number of web pages with key components having acceptable download time}(T)}{\text{Total number of downloaded web pages with key components}(T)} \times 100$$

where T represents a sample.

In some implementations, the service provider assigns weights to key components based upon customer access patterns and predicted customer expectations and calculates the CSL using the following formula:

$$CSL(T) = \sum_{n=0}^{n-1} Weight_n \cdot \frac{Acceptable_n(T)}{Acceptable_n(T) + Unacceptable_n(T)}$$

where n represents the key components of a particular page and T is a sample. Generally, customers expect high hit pages to load quickly and tend to have a much lower customer satisfaction level when high hit pages are negatively impacted by an event, e.g., a slowdown of a key data-providing resource, such as a database. Accordingly, the service provider may assign a heavier weight to the key components of a high hit page, e.g., the NetBenefits home page (shown in FIG. 2a), as compared to the weighting of the key components of a low hit page, e.g., the NetBenefits Web page that is displayed when Pat Smith clicks on the "Pay" link (FIG. 2b). In other examples, the service provider may assign a heavier weight to the key components of a Web page on particular day(s) of the week, month or year, e.g., the "Balances" page of the NetBenefits application may be assigned a heavier weight on every second Friday of the month when employees are paid. In so doing, if the key components of a high hit page experience an event, a reduction in the CSL will be more apparent on its face and the service provider may be more quickly alerted of the low CSL.

Optionally, the monitoring application 110d may be preconfigured by a service provider operator to assign a weighting level based on the volume of customers attempting to access the NetBenefits application. For example, the monitoring application 110d may assign a first set of weights to the key components of the Web site when the number of customers accessing the NetBenefits application is less than 5,000 per hour, and otherwise assign a second set of weights to the key components.

Figure 4:
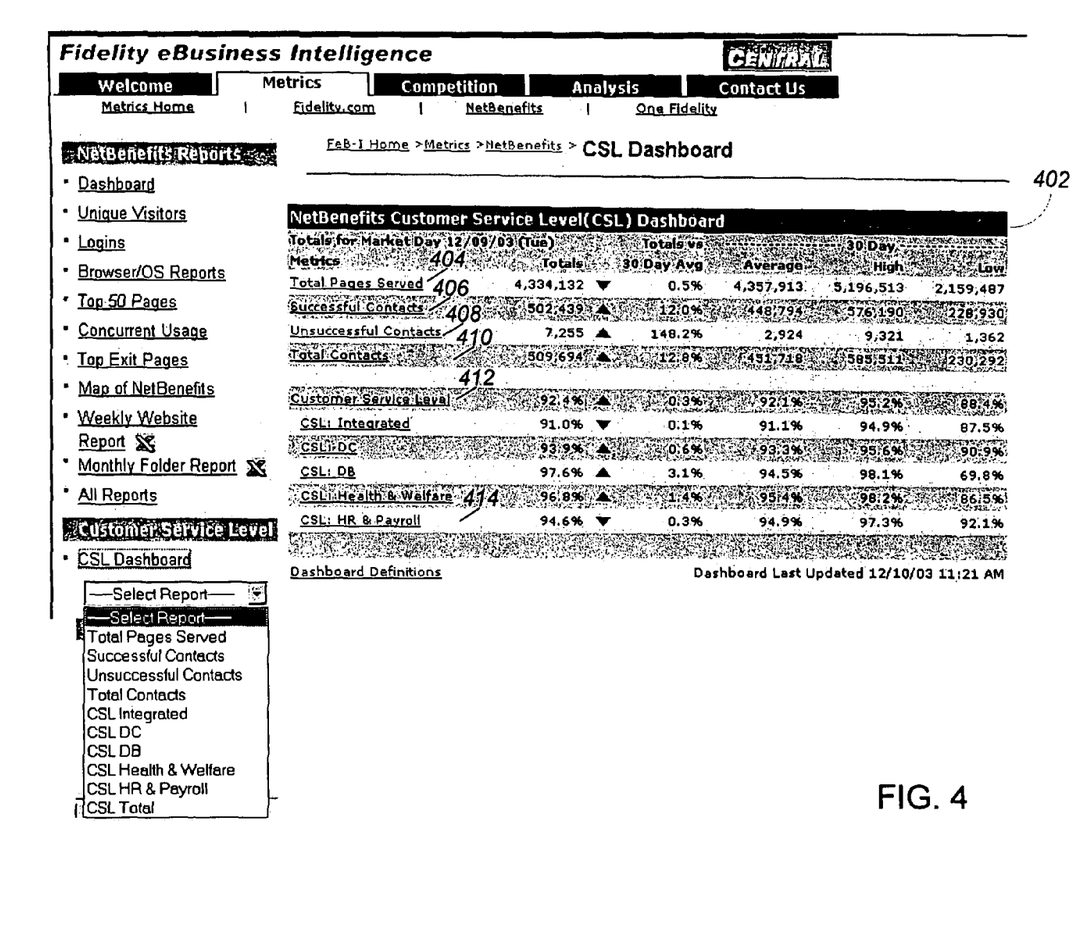
FIG. 4 is a screenshot of a Customer Service Level (CSL) dashboard for a Web-based service.

Optionally, the monitoring application 110d can be configured to calculate the CSLs in 5-minute intervals, 24-hour intervals, or other period-based intervals. The monitoring application 110d can also be configured to produce tables, charts or reports that provide the CSLs for a particular application, e.g., the NetBenefits application, in a graphical user interface (GUI). FIG. 4 shows an example screenshot of a CSL dashboard 402 for the NetBenefits application. The NetBenefits CSL dashboard 402 provides, in a central location, information or links related to the CSLs for the NetBenefits application of FIGS. 2a, 2b, and 2c. Examples of information include, for a particular day (e.g., Dec. 9, 2003), the total number of pages served 404, the total number of successful contacts 406 (e.g., the number of successful logins), the total number of unsuccessful contacts 408 (e.g., the number of login attempts which failed because of an incorrect user identifier-password combination), and the total number of contacts 410. Examples of information also include, for the particular day (e.g., Dec. 9, 2003), the overall CSL 412 for the NetBenefits Web site, as well as the CSLs for distinct portions of the NetBenefits Web site (e.g., the CSL 414 for the "HR & Payroll" portion of the NetBenefits Web site). For more detailed information about the breakdown for any given CSL, a user can select a link (e.g., the "CSL: HR & Payroll" link) shown on the NetBenefits CSL dashboard 402.

In some implementations, the monitoring application 110d receives as input (e.g., from Adlex Inc.) statistics related to traffic patterns on the Internet and uses these statistics to provide a historical context to real-time reports. In this manner, the service provider can differentiate between a CSL that is negatively impacted by an application-related event (e.g., the failure of the database) as opposed to a non-application-related event (e.g., the crippling effects of a virus).

The described techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. For example, the described techniques can be performed in a different order and still achieve desirable results. Although the description discusses the context of Web pages, other systems which enable user interaction through a communication network may also benefit from the features discussed.

What is claimed is:

1. A computer-based method, the method comprising:
   accessing by a computer a user defined selection of a set of key components of a web page that has a plurality of components, with each component including one or more displayable objects visually perceptible as a unit, the set of key components having a total number of key components and being a proper subset of the plurality of components of the web page, which corresponds to at least one but not all of the plurality of components of the web page;
   sending to a user computer device by the computer via a communication network, the plurality of components of the web page, with sending being in response to a request for the web page;
   measuring, by one or more computers, a performance value for each of the key components of the web page sent to the user;
   comparing, by the one or more computers, the measured performance value for each of the key components to a corresponding target performance value for each of the key components;
   determining, by the one or more computers, a number of the key components having acceptable performance values that are values less than or equal to the target performance value for the respective component;
   differentially weighting one or more key components of the proper subset based on a number of customers accessing the web page at a particular time; and
   generating, by the one or more computers, a weighted customer service level value based on the number of key components having acceptable performance values, the differential weighting of the one or more key components, and the total number of key components in the web page.

2. The method of claim 1, wherein the performance value is measured using a time-based metric.

3. The method of claim 1, further comprising:
   accessing by the one or more computers, the corresponding target performance value for each key component of the proper subset.

4. The method of claim 1, further comprising:
   receiving by the one or more computers information indicative of a user designation of key components of the web page; and
   receiving by the one or more computers information indicative of a user selection of a target performance value for each of the key components.

5. The method of claim 1, further comprises:
   receiving an indication of a group of key components and a target value for the group of key components; and
   generating, by the one or more computers a customer service level based on the number of key components and the group of key components in the web page.

6. The method of claim 5, further comprising:
   receiving by the one or more computers information indicative of a user designation of the group of key components of the web page; and
   receiving by the one or more computers information indicative a user selection of the target performance value for the group of key components.

7. The method of claim 1 wherein a displayable object of a web page is one or more of a word, a line of text, a paragraph of text, an image, a hyperlink, a button, and a counter.

8. A computer program product, tangibly stored on a computer readable hardware storage device, the computer program product comprising instructions to cause a data processing apparatus to:
   access a user defined selection of a set of key components of a web page that has a plurality of components, with each component including one or more displayable objects visually perceptible as a unit, the set of key components having a total number of key components and being a proper subset of the plurality of components of the web page that corresponds to at least one but not all of the plurality of components of the web page;
   send to a user computer device via a communication network, the plurality of components of the web page in response to a request for the web page;
   measure a performance value for each of the key components of the web page sent to the user;
   compare the measured performance value for each of the key components to a corresponding target performance value for each of the key components;
   determine a number of the key components having acceptable performance values that are values less than or equal to the target performance value for the respective component;
   differentially weight one or more key components of the proper subset based on a number of customers accessing the web page at a particular time; and
   generate a weighted customer service level value based on the number of key components having acceptable performance values, the differential weighting of the one or more key components, and the total number of key components in the web page.

9. The computer program product of claim 8, wherein the performance value is measured using a time-based metric.

10. The computer program product of claim 8 further comprises instructions for causing the data processing apparatus to:
    access the corresponding target performance value for each key component of the proper subset.

11. The computer program product of claim 8 further comprises instructions for causing the data processing apparatus to:
    receive information indicative of a user designation of key components of the web page; and
    receive information indicative of a user selection of a target performance value for each of the key components.

12. The computer program product of claim 8, wherein the computer program product further comprises instructions to:
    receive an indication of a group of key components and a target value for the group of key components; and
    generate a customer service level based on the number of key components and the group of key components in the web page.

13. The computer program product of claim 12, further comprising instructions to:
    retrieve information indicative of a user designation of the group of key components of the web page; and
    retrieve information indicative of a user selection of the target performance value for the group of key components.

14. The computer program product of claim 8 wherein a displayable object of a web page is one or more of a word, a line of text, a paragraph of text, an image, a hyperlink, a button, and a counter.

15. A computer system comprising:
a processor; and
a computer readable storage medium, storing a computer program product comprising instructions for causing the processor to:
access a user defined selection of a set of key components of a web page that has a plurality of components, with each component including one or more displayable objects visually perceptible as a unit, the set of key components having a total number of key components and being a proper subset of the plurality of components of the web page that corresponds to at least one but not all of the plurality of components of the web page;
send to a user computer device via a communication network, the plurality of components of the web page in response to a request for the web page;
a performance value for each of the key components of the web page sent to the user;
compare the measured performance value for each of the key components to a corresponding target performance value for each of the key components;
determine a number of the key components having acceptable performance values that are values less than or equal to the target performance value for the respective component;
differentially weight one or more key components of the proper subset based on a number of customers accessing the web page at a particular time; and
generate a weighted customer service level value based on the number of key components having acceptable performance values, the differential weighting of the one or more key components, and the total number of key components in the web page.

16. The system of claim 15, wherein the performance value is measured using a time-based metric.

17. The system of claim 15, wherein the computer program product further comprises instructions for causing the processor to:
access the corresponding target performance value for each key component of the proper subset.

18. The system of claim 15, wherein the computer program product further comprises instructions for causing the processor to:
receive information indicative of a user designation of key components of the web page; and
receive information indicative of a user selection of a target performance value for each of the key components.

19. The system of claim 15, wherein the computer program product further comprises instructions for causing the processor to:
receive an indication of a group of key components and a target value for the group of key components; and
generate a customer service level based on the number of key components and the group of key components in the web page.

20. The system of claim 19, wherein the computer program product further comprises instructions to:
retrieve information indicative of a user designation of the group of key components of the web page; and
retrieve information indicative of a user selection of the target performance value for the group of key components.

21. The system of claim 15 wherein a displayable object of a web page is one or more of a word, a line of text, a paragraph of text, an image, a hyperlink, a button, and a counter.

* * * * *